(12) United States Patent
Didion

(10) Patent No.: US 9,932,760 B1
(45) Date of Patent: Apr. 3, 2018

(54) METHOD OF SECURING A PIVOT HANDLED TOOL

(71) Applicant: Scott Allen Didion, Fayetteville, NC (US)

(72) Inventor: Scott Allen Didion, Fayetteville, NC (US)

(*) Notice: Subject to any disclaimer, the term of this patent is extended or adjusted under 35 U.S.C. 154(b) by 0 days.

(21) Appl. No.: 15/498,046

(22) Filed: Apr. 26, 2017

Related U.S. Application Data

(60) Provisional application No. 62/486,030, filed on Apr. 17, 2017.

(51) Int. Cl.
  *B26B 17/02* (2006.01)
  *E05B 73/00* (2006.01)
  *E05B 67/38* (2006.01)
  *B26B 13/28* (2006.01)
  *B23D 29/00* (2006.01)
  *B65D 75/00* (2006.01)
  *B65B 53/00* (2006.01)

(52) U.S. Cl.
  CPC ............ *E05B 73/00* (2013.01); *B23D 29/002* (2013.01); *B26B 13/28* (2013.01); *B26B 17/02* (2013.01); *B65B 53/00* (2013.01); *B65D 75/002* (2013.01); *E05B 67/383* (2013.01); *Y10T 29/4984* (2015.01); *Y10T 29/49947* (2015.01)

(58) Field of Classification Search
  CPC ............ Y10T 29/4984; Y10T 29/4978; Y10T 29/49948; Y10T 29/49947; E05B 73/00; B23D 29/002; B26B 17/02; B26B 13/28; B25H 3/04

USPC ................ 30/262; 70/61, 200, 203
See application file for complete search history.

(56) References Cited

U.S. PATENT DOCUMENTS

| 63,721 | A | * | 4/1867 | Handy | ............... B26B 17/02 30/193 |
| 188,133 | A | * | 3/1877 | Hellwig | ............... B26B 17/02 30/191 |
| 584,684 | A | * | 6/1897 | Harris | ............... B26B 17/02 30/193 |
| 836,388 | A | * | 11/1906 | Kyle | ............... B26B 29/04 30/233 |
| 5,746,074 | A | * | 5/1998 | Collins | ............... A01D 34/828 70/14 |

FOREIGN PATENT DOCUMENTS

| DE | 969950 C | * | 7/1958 | ............. B26B 17/02 |
| DE | 3402544 A1 | * | 8/1985 | ............. B26B 17/02 |
| DE | 102005031991 A1 | * | 2/2006 | ............. B26B 17/02 |

* cited by examiner

*Primary Examiner* — Jermie Cozart
(74) *Attorney, Agent, or Firm* — Robert J. Hess; Hess Patent Law Firm

(57) ABSTRACT

An apparatus and method to secure a bolt cutter, wire cutter, cable cutter or other type of pivot handled tool with two protruding tabs whose apertures align with each other as the handles of the pivot handled tool enter a closed position. A shackle of a padlock may be inserted through the aligned apertures to lock the handles in the closed position.

8 Claims, 2 Drawing Sheets

METHOD OF SECURING A PIVOT HANDLED TOOL

CROSS-REFERENCE TO RELATED APPLICATIONS

The present application is accorded the benefit of priority from provisional patent application No. 62/486,030 filed Apr. 17, 2017.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable

BACKGROUND OF THE INVENTION

(1) Field of the Invention

The present invention resides in a safeguard and/or safety feature for a pivot handled tool that makes it possible to lock the bolt cutter or the pivot handled tool in the closed position. A pivot handled tool includes bolt cutters, wire cutters, cable cutters, shears, scissors and any combination thereof.

(2) Description of Related Art Including Information Disclosed Under 37 CFR 1.97 and 1.98

Burglary tools are any tools or devices that are used to assist a person in committing burglary. Also called "burglar's tools", or burglar tools, they are illegal to possess with the intent to commit a burglary.

Would be burglars may opt not to carry their own equipment to access structures for the reason that if they were to be stopped and searched by law enforcement authorities, there would be no physical proof of their nefarious intentions.

Such burglars are much more likely to use tools at the premises where they intend to gain access. Thus, the locking of such tools on the premises frustrates such unauthorized use and in that sense is a safeguard.

Also, insurance companies may not cover all losses in a burglarized structure if the means to gain access to stolen or damaged items that were burglarized was the fault of the home or business owner.

The present inventor has observed that many bolt cutters are too large and cumbersome to fit into common tool storage devices. This makes securing them against unauthorized use difficult.

According to an online article entitled "7 Safety Tips to Remember when Using Bolt Cutters":

When it comes to cutting through heavy metal, bolt cutters or croppers are a useful tool. They allow you to cut your way out of a difficult situation. Padlocks, fences, chains and bolts can all yield to the pressure applied by croppers. It makes a vital rescue tool and is a must-have tool for the homeowner. Handy as the bolt cutter is, if not properly handled, it can cause injuries.

Avoid running your fingers over the blade edges to test for sharpness. The sharp blades of the bolt cropper can easily cut through your flesh. You should also be extra careful if you have children in the house. Be sure to keep croppers securely away after each use. These are not the sort of item you want a child to stumble upon.

Conventional pivot handled tools are bolt cutters, wire cutters, cable cutters, shears, scissors or any combination thereof. Pivot handled tools may or may not have a spring bias that bias their two handles into their open position so that squeezing the handles into their closed position is against the spring bias.

According to the online encyclopedia Wikipedia:

A padlock is composed of a body, shackle, and locking mechanism. The typical shackle is a "U" shaped loop of metal (round or square in cross-section) that encompasses what is being secured by the padlock (e.g., chain link or hasp). Generally, most padlock shackles either swing away (typical of older padlocks) or slide out of the padlock body when in the unlocked position. Less common designs include a straight, circular, or flexible (cable) shackle. Some shackles split apart and come together to lock and unlock.

There are two basic types of padlock locking mechanisms: integrated & modular. Integrated locking mechanisms directly engage the padlock's shackle with the tumblers. Examples of integrated locking mechanisms are rotating disks (found in "Scandinavian" style padlocks where a disk rotated by the key enters a notch cut into the shackle to block it from moving) or lever tumblers (where a portion of the bolt that secures the shackle enters the tumblers when the correct key is turned in the lock). Padlocks with integrated locking mechanisms are characterized by a design that does not allow disassembly of the padlock. They are usually older than padlocks with modular mechanisms and often require the use of a key to lock.

The more modern modular locking mechanisms, however, do not directly employ the tumblers to lock the shackle. Instead, they have a plug within the "cylinder" that, with the correct key, turns and allows a mechanism, referred to as a "locking dog" (such as the ball bearings found in American Lock Company padlocks) to retract from notches cut into the shackle. Padlocks with modular locking mechanisms can often be taken apart to change the tumblers or to service the lock. Modular locking mechanism cylinders frequently employ pin, wafer, and disc tumblers. Padlocks with modular mechanisms are usually automatic, or self-locking (that is, the key is not required to lock the padlock). Combination locks do not use keys. Instead, the lock opens when its wheels are lined up correctly to display the correct combination.

It is desired to add a safeguard or safety feature that locks the pivot handled tool in their closed position in a secure manner so as to render them inoperative at least until the lock is removed.

BRIEF SUMMARY OF THE INVENTION

One aspect of the invention resides in a safeguard and/or safety addition for any conventional bolt cutter or type of pivot handled tool that makes it possible to lock a bolt cutter or other type of pivot handled tool in the closed position using, but not limited to, a locking mechanism such as a padlock. This addition is a pair of apertured tabs fixed to two handles respectively of the bolt cutter or pivot handled tool. The apertured tabs each have respective openings or apertures that align with each other in a closed position of the handles (when they are in a neighboring relation with each other) and thereby fix the blades of the bolt cutter or operative implement side of another type of pivot handled tool in the closed position.

BRIEF DESCRIPTION OF THE SEVERAL VIEWS OF THE DRAWING(S)

For a better understanding of the present invention, reference is made to the following description and accompanying drawings, while the scope of the invention is set forth in the appended claims.

DETAILED DESCRIPTION OF THE INVENTION

Figures 1, 2:
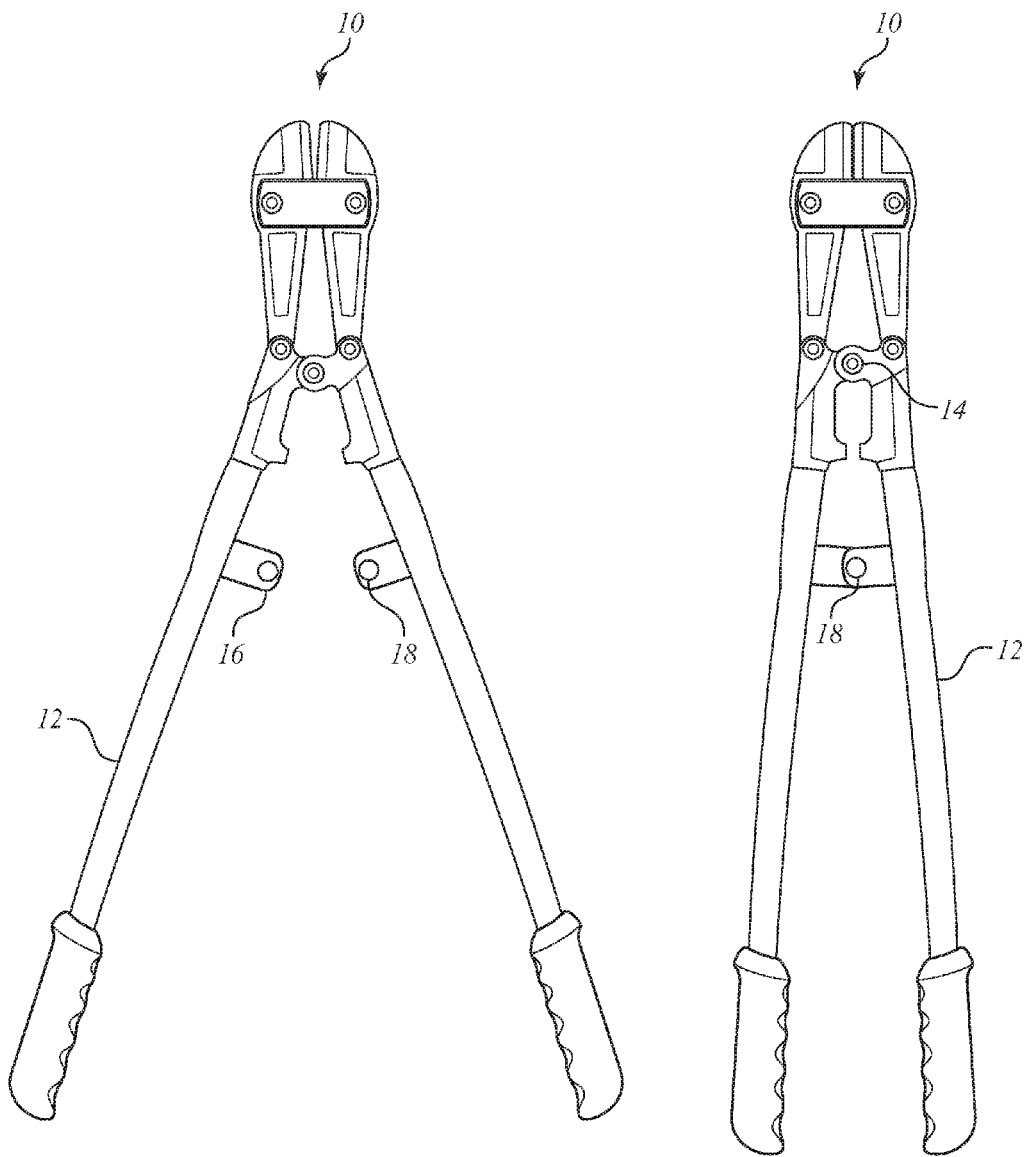
FIG. 1 shows a conventional bolt cutter whose handles are pivoted into an open position and equipped with two apertured tabs in accordance with the invention.
FIG. 2 shows the conventional bolt cutter of FIG. 1 in its closed position with the handles rotated about a pivot so as to align apertures in the two apertured tabs with each other.

Turning to the drawing, progressive views are shown for locking a conventional bolt cutter 10 in its closed position. The handles 12 of the bolt cutter 10 are squeezed together from an open position of FIG. 1 to a closed position of FIG. 2 by pivoting about a pivot 14. In the closed position, openings or apertures 18 of two apertured tabs 16 align as shown in FIG. 2. The aligned openings 18 accommodate insertion of a shackle 20 of a locking mechanism 22, such as a padlock.

The free the bolt cutter 10 from such a locked condition, the locking mechanism 22 must be unlocked and its shackle 20 removed from the aligned openings or apertures 18 of the apertured tabs 16. The handles 12 may then be rotated about the pivot from the closed position of FIG. 2 to the open position of FIG. 1.

In accordance with the invention, the two apertured tabs 16 are fixed to the two handles respectively as a safeguard and/or safety feature.

Figure 3:
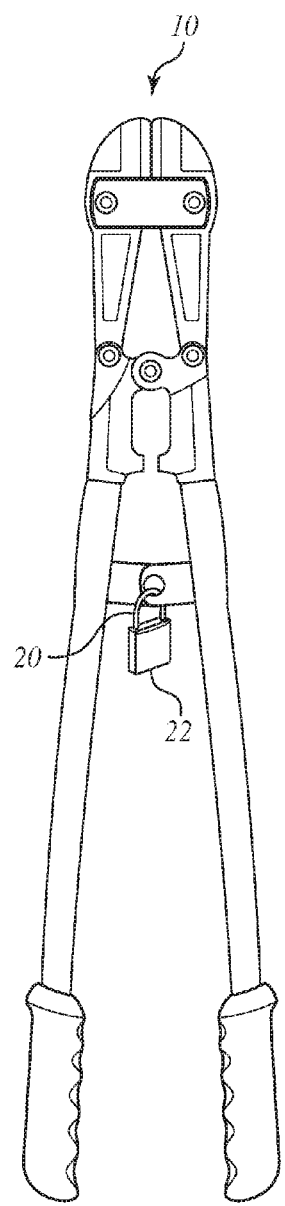
FIG. 3 shows the conventional bolt cutter of FIG. 2 with the two apertured tabs whose apertures are aligned with each other and with a shackle of a padlock inserted through both of the aligned apertures and closed to lock the padlock.

Each tab 16, offset to one another on each handle 12, has a respective opening or aperture 18 that, when the bolt cutter or other type of pivot handled tool is in the closed position, align with each other making it possible for a shackle 20 of a locking mechanism 22 (such as a padlock) to be inserted through both openings or apertures 18 simultaneously as shown in FIG. 3. This will make the bolt cutter inoperable for its intended purpose unless the locking mechanism 22 is removed after being unlocked.

The addition of such apertured tabs 16 with openings or apertures 18 that align may be secured to pivoting handles of any other kind of pivot handled tool for which its two handles that can be squeezed toward each other into a closed position and spread apart into an open position. As mentioned previously, the pivot handled tool may be bolt cutters, wire cutters, cable cutters, shears, scissors or any combination thereof. The safeguard or safety feature of the invention does not interfere with or affect the intended use of the pivot handled tool when the handles are unlocked without the locking mechanism present.

Indeed, the placement of the apertured tabs 16 and their aligned openings or apertures 18 for insertion of a shackle 20 of a locking mechanism on pivoting handles of a bolt cutter or other type of pivot handled tool is designed as both an added security/safety feature for inexperienced users and as a safeguard against unauthorized use. In the case of the latter, a person with criminal intent would find the bolt cutter or other type of pivot handled tool inoperative so that the bolt cutter or other type of pivot handled tool could not be used for cutting locks or chains that are used to secure belongings of a homeowner.

Bolt cutters, wire cutters and cable cutters are inherently dangerous if they are used by inexperienced individuals or children. This safety or safeguard improvement of adding such tabs whose openings or apertures align to accommodate insertion of a lock shackle may reduce the likelihood of injuries to such inexperienced individuals and children.

While it is preferred that the apertured tabs 16 be affixed to the respective handles 12 during the manufacturing process, the tab 16 could instead be affixed as an add-on feature after manufacture of the bolt cutting device or other type of pivot handled tool has been already manufactured. Thus, a consumer could purchase the bolt cutter device or other type of pivot handled tool and then send it to a service that affixed the tabs. The locking mechanism could be purchased separately or provided by the service provider who affixed the tabs.

Figure 4:
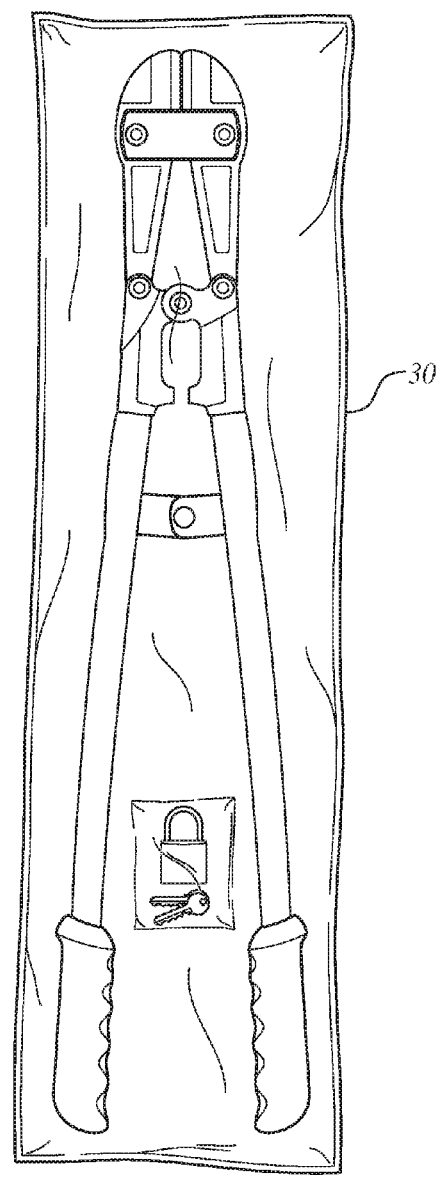
FIG. 4 shows the conventional bolt cutter with two aperture tabs in accordance with the invention of FIGS. 1-3 all packaged together with a padlock in a common package.

Further, the bolt cutter device or other type of pivot handled tool 10 with the apertured tabs 16 affixed to the respective handles 12 may be packaged together in a common package 30 with the locking mechanism 22 so that both may be sold together as shown in FIG. 4. The common package 30 could be a conventional shrink wrap packaging around the assembly of FIG. 3 but with a key (not shown) included. Alternatively, the packaging may be conventional clear plastic packaging whose halves are shaped to accommodate therebetween the pivot handled tool and padlock with key. The halves are welded together with any one of various conventional techniques, such as sonic welded or thermal welded.

Preferably, the apertured tabs 16 are made of metal. Such metal apertured tabs 16 are affixed, e.g., welded, clamped, pressed, molded or adhered into or onto each of the two handles 12 of the bolt cutter or other type of pivot handled tool 10 during the manufacturing process or subsequently.

While the foregoing description and drawings represent the preferred embodiments of the present invention, it will be understood that various changes and modifications may be made without departing from the scope of the present invention.

SEQUENCE LISTING

Not applicable.

What is claimed is:

1. A method to secure a pivot handled tool, comprising the steps of:
pivoting two handles of a pivot handled tool relative to each other from a spread apart relation to a neighboring relation with respect to each other, the two handles each having respective apertured tabs, each of the respective aperture tabs having an associated aperture, each of the associated apertures being out of alignment with each other as the two handles are pivoted into the spread apart relation and being in alignment with each other as the two handles are pivoted into the neighboring relation;
aligning associated apertures of each of the respective apertured tabs with each other as the two handles of the pivot handled tool pivot into the neighboring relation with each other after pivoting out of the spread apart relation; and
inserting a shackle of a padlock through both of the associated apertures that are aligned with each other to simultaneously secure the two apertured tabs to each other and thereby secure the two handles in the neighboring relation to each other.

2. The method of claim 1, further comprising:
affixing the respective apertured tabs to the two handles; and
selecting the affixing from the group consisting of welding, clamping, pressing, molding and adhering into or onto each of the handles of the pivot handled tool.

3. The method of claim 1, further comprising:
selecting the pivot handled tool from the group consisting of bolt cutters, wire cutters, cable cutters, shears, scissors and any combination thereof.

4. The method of claim 1, further comprising:
packaging the padlock together with the pivot handled tool and the two apertured tabs within a common package.

5. A method to secure a pivot handled tool, comprising the steps of:
pivoting two handles of a pivot handled tool about a pivot from a spread apart relation with each other to a neighboring relation with each other, the two handles each having a respective apertured tab, each respective tab having an associated aperture, each of the associated apertures being out of alignment with each other as the two handles are pivoted into the spread apart relation and being in alignment with each other as the two handles are pivoted into the neighboring relation;
aligning the associated aperture of each of the apertured tabs with each other as the two handles pivot into the neighboring relation with each other after leaving the spread apart relation; and
wherein the apertures accommodate insertion of a shackle of a padlock through both of the apertures that are aligned with each other to simultaneously secure the respective apertured tabs with each other and thereby secure the two handles in the neighboring relation.

6. The method of claim 5, further comprising:
affixing the respective apertured tabs to the two handles; and
selecting the affixing from the group consisting of welding, clamping, pressing, molding and adhering into or onto each of the handles of the pivot handled tool.

7. The method of claim 5, further comprising:
selecting the pivot handled tool from the group consisting of bolt cutters, wire cutters, cable cutters, shears, scissors and any combination thereof.

8. The method of claim 5, further comprising:
packaging the padlock together with the pivot handled tool and the two apertured tabs within a common package.

* * * * *